(12) United States Patent
Oppici

(10) Patent No.: US 7,874,417 B2
(45) Date of Patent: Jan. 25, 2011

(54) MACHINE FOR GROUPING PACKS

(75) Inventor: Giorgio Oppici, Rubbiano-Solignano (IT)

(73) Assignee: A.C.M.I. Societa' per Azioni, Parma (IT)

( * ) Notice: Subject to any disclaimer, the term of this patent is extended or adjusted under 35 U.S.C. 154(b) by 110 days.

(21) Appl. No.: 12/301,697

(22) PCT Filed: Apr. 27, 2007

(86) PCT No.: PCT/EP2007/054189

§ 371 (c)(1),
(2), (4) Date: Dec. 11, 2008

(87) PCT Pub. No.: WO2007/137923

PCT Pub. Date: Dec. 6, 2007

(65) Prior Publication Data

US 2009/0266677 A1    Oct. 29, 2009

(30) Foreign Application Priority Data

May 26, 2006    (IT) .......................... RE2006A0064

(51) Int. Cl.
*B65G 47/26* (2006.01)
(52) U.S. Cl. .................. 198/419.3; 198/419.2
(58) Field of Classification Search ............. 198/419.2, 198/419.3, 461.1, 462.1, 460.1, 460.3, 461.3
See application file for complete search history.

(56) References Cited

U.S. PATENT DOCUMENTS

| 3,938,650 | A * | 2/1976 | Holt ........................ 198/419.3 |
| 5,147,027 | A * | 9/1992 | Cruver .................... 198/419.3 |
| 5,667,055 | A * | 9/1997 | Gambetti ................. 198/419.3 |
| 6,648,125 | B1 * | 11/2003 | Bershadsky .............. 198/460.1 |
| 6,793,064 | B2 * | 9/2004 | Schoeneck et al. ....... 198/419.3 |
| 6,843,360 | B2 * | 1/2005 | Peterman et al. ........... 198/429 |
| 2004/0154902 | A1 | 8/2004 | Schoeneck et al. |
| 2008/0283360 | A1 * | 11/2008 | Aronsson ................. 198/419.3 |

FOREIGN PATENT DOCUMENTS

| EP | 1 688 375 | 8/2006 |
| WO | WO 2006/089831 | 8/2006 |

* cited by examiner

*Primary Examiner*—James R Bidwell
(74) *Attorney, Agent, or Firm*—Occhiuti Rohlicek & Tsao LLP

(57) ABSTRACT

A machine for grouping packs includes a sliding work plane for advancing in sequence at least a consecutive and equidistanced row of packs along a predetermined advancing direction (A); and a retaining means for cyclically braking the advancing of one of the packs of the row with respect to the sliding work plane, the retaining means including at least a striker body and a moving means for cyclically locating the striker body close to a pack advancing on the work plane, such that the striker body receives the pack in contact there-with, preventing the pack from advancing at a same speed as a previous speed thereof on the work plane.

24 Claims, 6 Drawing Sheets

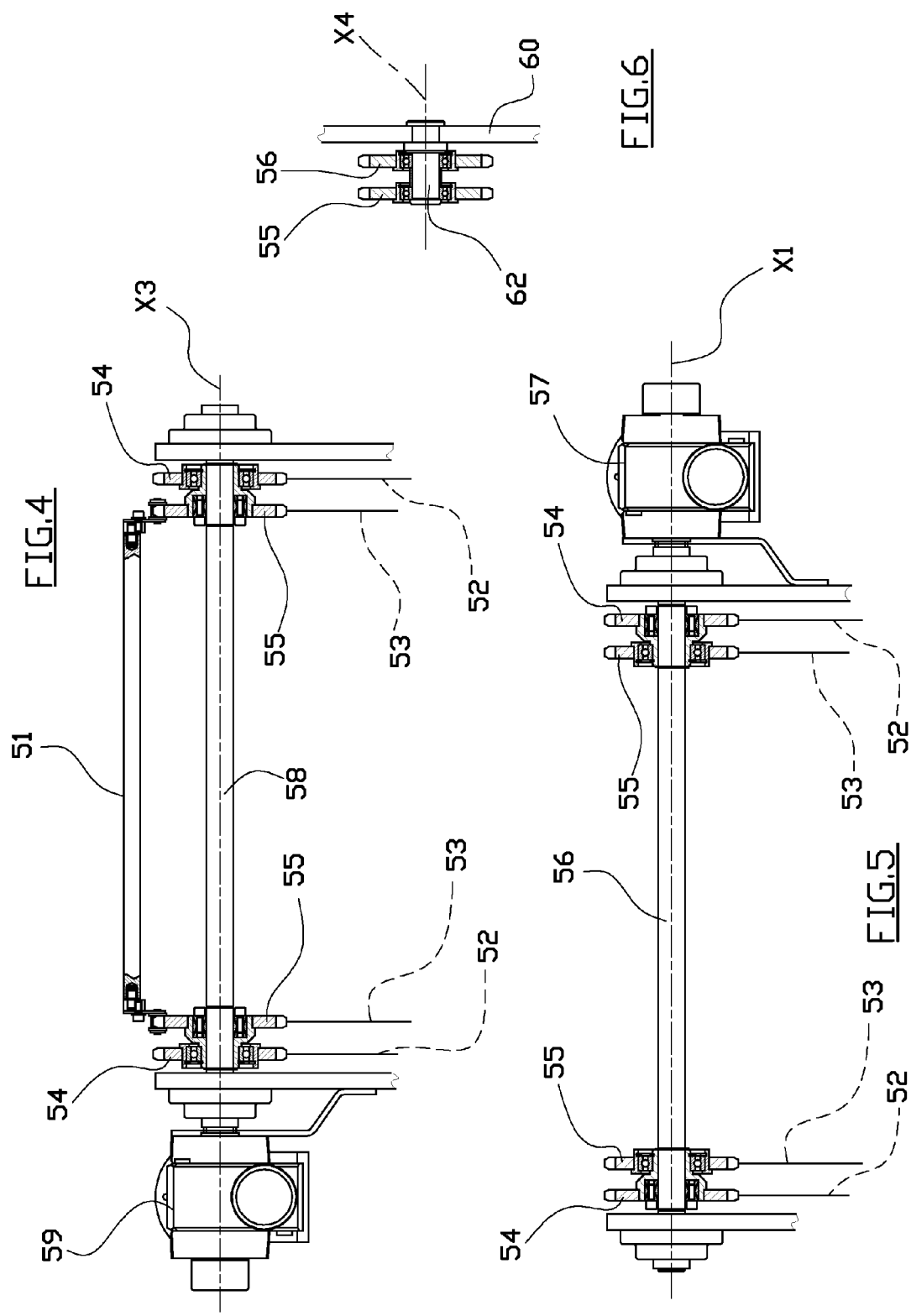

MACHINE FOR GROUPING PACKS

CROSS-REFERENCE TO RELATED APPLICATIONS

This application is being filed as a U.S. National Stage under 35 U.S.C. 371 of International Application No. PCT/EP2007/054189, filed on Apr. 27, 2007, which claims the benefit of Italian Application No. RE2006A000064, filed May 26, 2006, the contents of which are hereby incorporated by reference in their entirety.

TECHNICAL FIELD

The invention relates, in general, to automatic plants for palletising packs made up of bottles or cans.

The expression "pack" is taken to mean a set formed of a discrete group of bottles or cans, typically six, twelve or twenty-four in number, which is packaged using a stabilising film of plastic material.

In more detail, the invention relates to a machine which is able to process a succession of packs which are advanced aligned along a supply line, producing a succession of separated groups that are singly formed by a set of packs, reciprocally grouped.

"Grouped" is taken to mean that the packs of each set are arranged adjacent to one another and very closely together, even in reciprocal contact.

BACKGROUND ART

As is known, in order to facilitate transport and storage of packs, the packs are generally grouped in an ordered fashion on usual load pallets.

In particular, each pallet supports a respective pile of packs, obtained by superposing a plurality of flat layers which are singly constituted by a group of coplanar packs placed adjacent to one another and loaded in advantageous directions.

To realise the pile of packs, palletising plants of known type predisposed each single layer on a service plane before moving the plane rigidly onto the pallet.

For this reason, these plants are generally provided with special mobile means for manipulating, such as for example plier devices, which grip and move one pack at a time in order to realise the desired layer on the service plane.

As is known, the packs can also be of different formats, for example according to the number of bottles or cans they are made up of, and the means for manipulation are generally able to adapt to the different dimensions of the packs.

From this fact, however, derives a drawback, i.e. that the productivity of the palletising plants depend to a considerable degree on the format of the packs being processed.

If a layer remains of the same overall dimensions, then if the packs are smaller, the means for manipulating will perform more operations and therefore each layer will take longer to be completed.

The aim of the present invention is to make available a machine which can group together discrete packs in order to obtain single groups having nonetheless about the same dimensions as larger-format packs.

In this way, the means for manipulating can treat each group of packs as if it were one only, thus effectively reducing the number of operations to be performed and therefore the overall time required, and in this way obviating the above-mentioned drawback in the prior art.

A further aim of the invention is to reach the above objective within the ambit of a simple, rational and economical solution.

These aims are attained by the invention as it is specified in the accompanying claims.

DISCLOSURE OF INVENTION

In more detail, the aims are attained by a machine for grouping packs, which machine comprises a moving work plane which advances at least a row of consecutive packs in sequence, which packs are reciprocally distanced, and means for retaining for cyclically braking the advancement of one of the packs of the row with respect to the underlying work plane.

In this way, the pack which is temporarily halted drags on the work plane which continues to move at the same speed, so that the following pack comes progressively nearer, up until it makes contact with the halted pack.

According to the invention, the means for retaining comprise at least a mobile striker body, which cyclically assumes an operative position in which it is interposed between two consecutive packs advancing on the work plane, and subsequently performs a displacement in the advancement direction of the work plane at a slower speed with respect thereto.

In this way, the entity of the dragging of the braked pack on the work plane can be effectively regulated in order to prevent any build-up of excessive friction; it is also possible to regulate the respective nearing velocity between the packs in order to prevent any unwanted impacts of too-great an intensity.

The means for retaining preferably comprise a plurality of the striker bodies, which reach the operative position at successive instants, so that each of them can perform the braking operation of the packs which follow each other along the moving work plane.

Thanks to this solution, while one of the striker bodies is completing the act of grouping-up a respective group of packs, or is bringing itself into the operative position, a second striker body is already ready to operate on the following group of packs, thus enabling the advancement velocity of the moving work plane to be increased, improving the machine's productivity.

According to the invention, the machine further comprises means for transferring for supplying the packs on the advancing work plane.

In particular, the means for transferring comprise at least two further moving planes arranged in series, of which one is a supply plane advancing a row of packs, and the other is a distancing plane, which moves faster with respect to the supply plane and receives one pack at a time from the supply plane in order to transfer it onto the work plane.

Thanks to this solution, in passing from the supply plane to the distancing plane, the packs in the row are distanced from one another, which ensures that on the work plane the packs are distanced by a sufficient quantity to enable the striker body to reach the operative position thereof.

The means for transferring preferably comprise a plurality of moving supply planes singly advancing a respective row of packs, and a corresponding plurality of distancing planes, each of which receives a pack at a time from a respective supply plane and transfers it onto the work plane.

In particular, the distancing planes all run in the same direction as the work plane, and are activated independently of each other in order to be able to move at different speeds to one another.

Further, the distancing planes are associated to a control system which varies the speeds thereof in order to align the packs in the relative rows in a transversal direction with respect to the common advancement direction.

In this way, the work plane receives and at the same time advances a plurality of parallel rows of packs, in which each single pack of each row is transversally aligned with a pack from the other row.

The striker body can be predisposed to brake a pack from each row contemporaneously, thus obtaining two important advantages.

The first advantage is the increase in productivity of the machine, due to the fact that the machine can contemporaneously group up a plurality of packs.

The second advantage consists in the fact that the rows of packs are sufficiently close to one another in a transversal direction, and groups can be made up of a group of packs both in longitudinal and in transversal direction.

BRIEF DESCRIPTION OF THE DRAWINGS

Further characteristics and advantages of the invention will better emerge from the detailed description that follows, given purely by way of non-limiting example with the aid of the accompanying figures of the drawings, in which:

FIG. 4 is a section along line IV-IV of FIG. 1;

FIG. 5 is a section along line V-V of FIG. 1;

FIG. 6 is a section along line VI-VI of FIG. 1;

BEST MODE FOR CARRYING OUT THE INVENTION

The figures show a machine 1 for processing a number of packs 100 in order to predisposed, on a service plane 10, advancing in direction A, a sequence of distinct groups of packs 100 which are grouped together.

"Grouped" is taken to mean that the packs 100 of each group are arranged adjacent to one another, and are so close to one another as to be treated, by following manipulation devices (not illustrated) as if they were one pack of a larger format.

The packs 100 of each group are preferably substantially in reciprocal contact.

Figure 1:
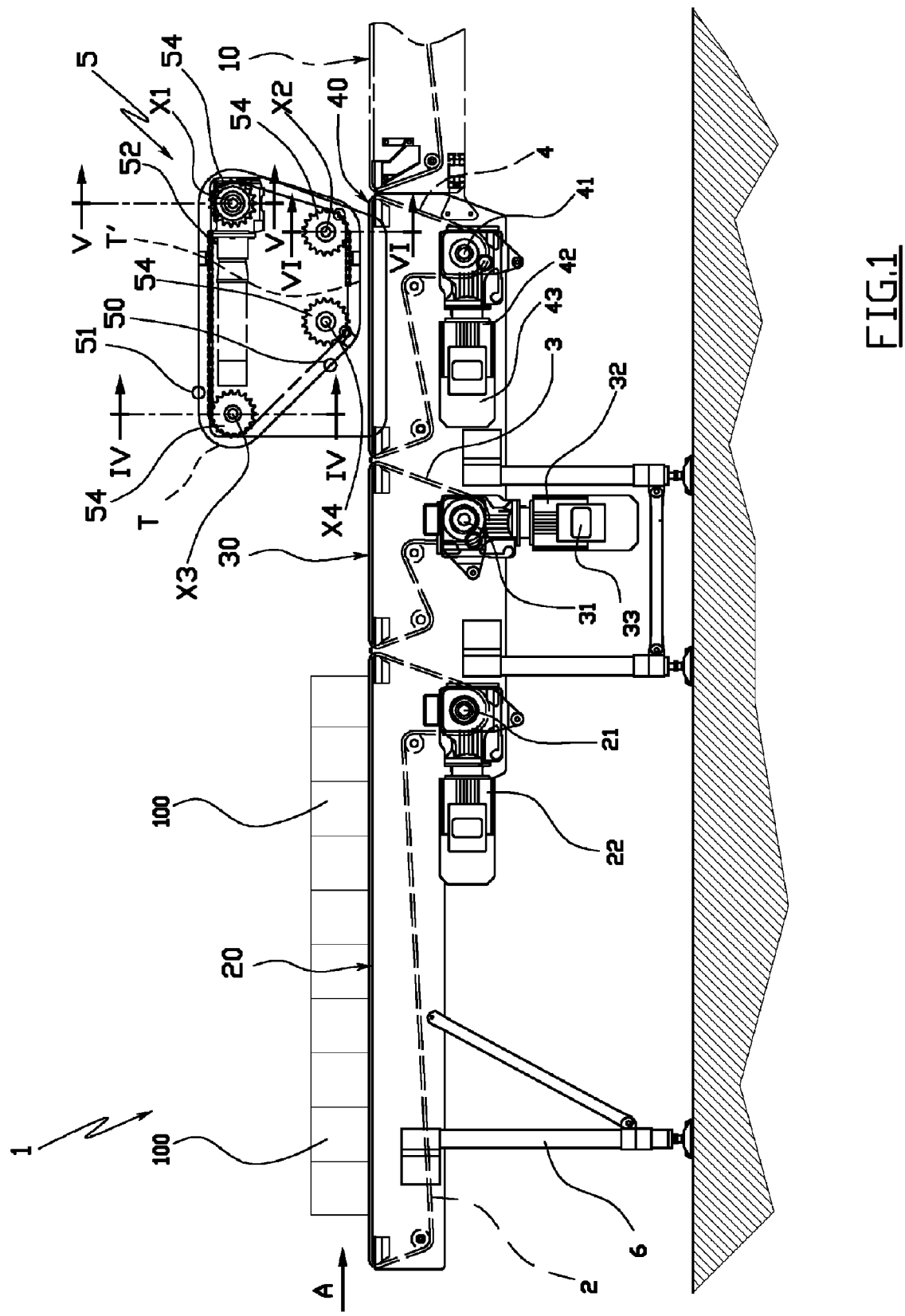
FIG. 1 is a schematic lateral view of a machine according to the invention.
Figure 2:
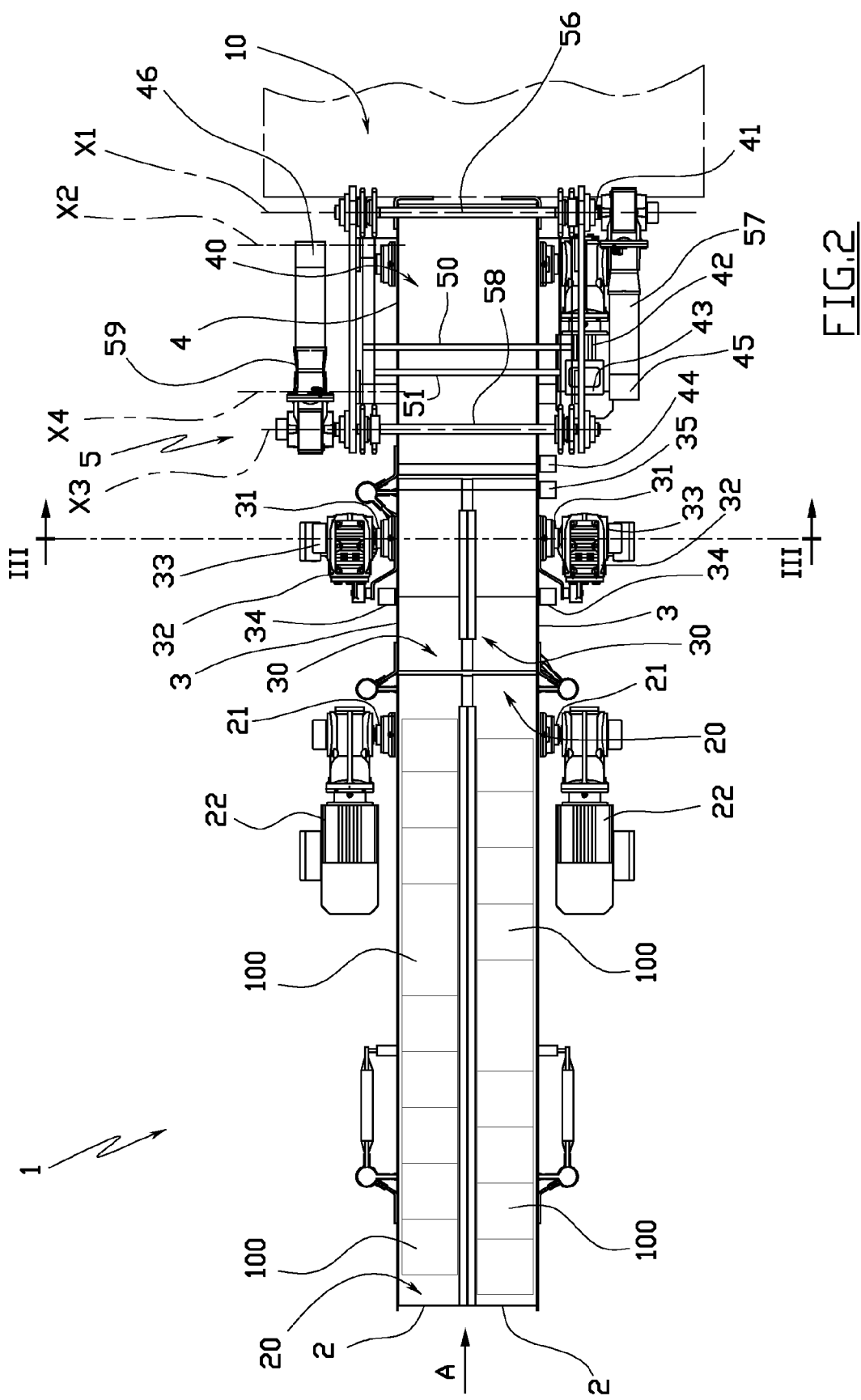
FIG. 2 is a plan view of the machine of claim 1.

As illustrated in FIGS. 1 and 2, the grouping machine 1 comprises a support frame 6 for stably resting on the ground.

Two first conveyor belts 6 are installed on the support frame 6, each of which conveyor belts 2 is activated independently by a respective motorised roller 21 which is rotated by an asynchronous motor 22.

The first conveyor belts 2 provide two respective horizontal supply planes 20 which are coplanar and advanceable in the same direction A.

A second conveyor belt 3 is placed in series with each of the two first conveyor belts 2, which second conveyor belt 3 is powered independently by a respective motorised roller 31 which is rotated by an asynchronous motor 32.

The second conveyor belt 3 provides a horizontal distancing plane 30, coplanar to the relative supply plane 20 and advancing in the same direction A as the supply plane 20.

Each distancing plane 30 is separated from the relative supply plane 20 by a considerably smaller distance than the base dimensions of a pack 100.

A third conveyor belt 4 is placed in series with each of the second conveyor belts 3, which third conveyor belt 4 is powered by a motorised roller 41 which is rotated by an asynchronous motor 42.

The third conveyor belt 4 provides a horizontal work plane 40, substantially coplanar with the distancing planes 30 and advancing in the same direction A as the distancing planes 30.

In particular, the work plane 40 has a transversal dimension which is equal to the overall transversal dimension of both the distancing planes 30.

Further, the work plane 40 is separated from the distancing planes 30 by a considerably smaller distance than the base dimension of a pack 100.

A control system is associated to the conveyor belts 2, 3 and 4 to oversee the operation thereof.

The control system comprises position sensors which detect the passage of the packs 100 advancing on the distancing planes 30 and the work plane 40, at predetermined fixed points.

In the example of FIG. 2, the position sensors comprise two first photocells 34 which are singly associated to a respective conveyor belt 3, such as to detect the passage of packs 100 at a substantially intermediate point of the relative distancing plane 30.

In particular, the detection points of the photocells 34 are reciprocally aligned in a perpendicular direction to the advancing direction A of the distancing planes 30.

A third photocell 35 is also associated to the second conveyor belts 3, which third photocell 35 is located downstream of the preceding photocells 34 with respect to the advancing direction A. The third photocell 35 detects the passage of the packs 100 at a point located substantially at the outlet of the distancing planes 30.

The position sensors further comprise a photocell 44 which is associated to the third conveyor belt 4, such as to detect the passage of the packs 100 at a point located substantially at the inlet of the work plane 40.

The control system further comprises sensors for measuring the advancement of the packs 100 on the distancing planes 30 and on the work plane 40.

In the illustrated example, the sensors comprise two encoders 33 which are respectively associated to the asynchronous motors 32 of the second conveyor belts 3, and an encoder 43 associated to the asynchronous motor 42 of the third conveyor belt 4.

Each of the encoders 33 and 43 counts the rotations made by the relative motorised roller, respectively 31 and 41.

As illustrated in the figures, the third conveyor belt 4 is associated to an overlying grouping device, denoted in its entirety by 5.

The grouping device 5 comprises two mobile rods 50 and 51, which are arranged parallel to the work plane 40 and perpendicular to the advancing direction A thereof.

Figure 3:
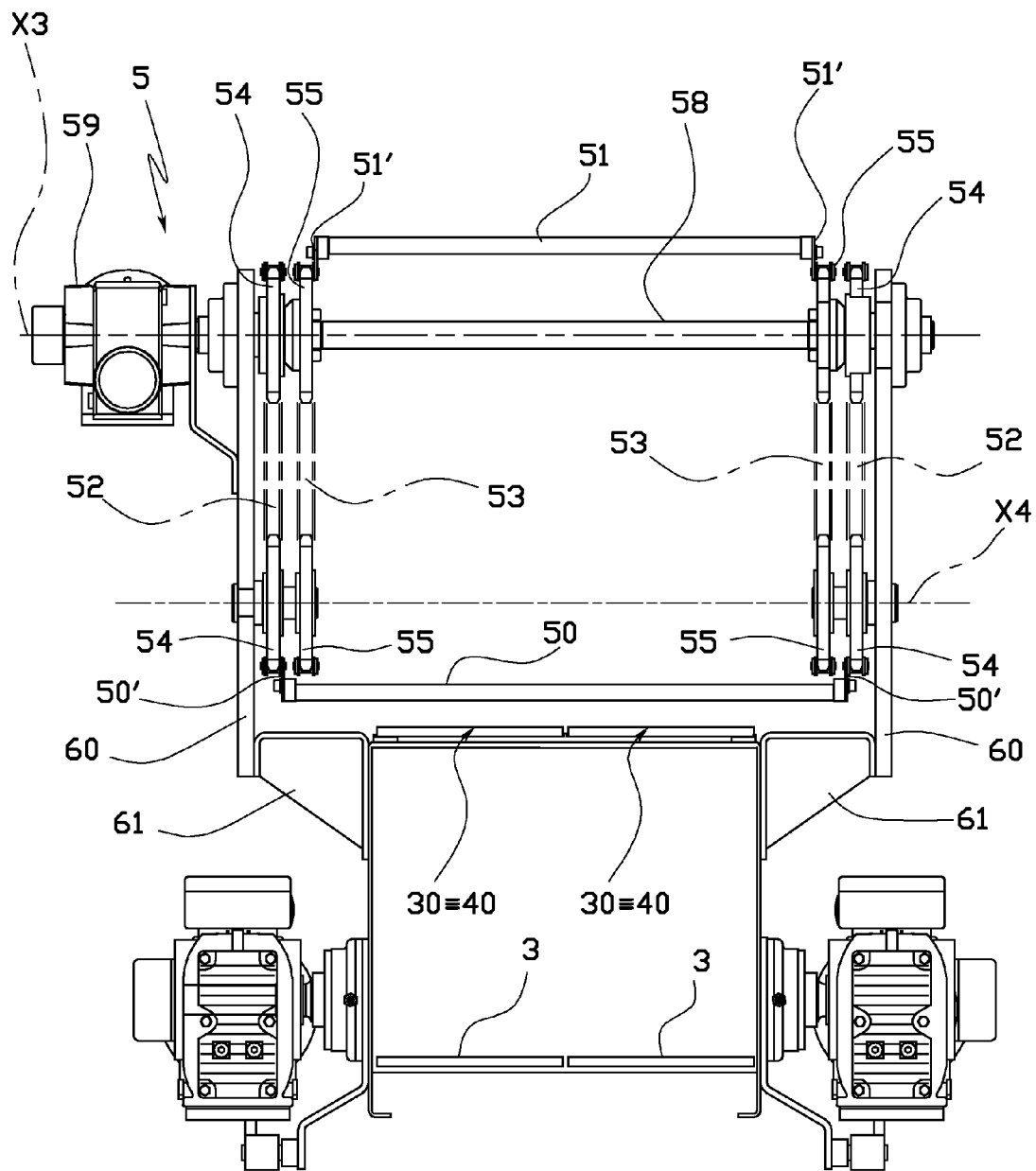
FIG. 3 is a section along line III-III of FIG. 2.

The mobile rods 50 and 51 are both longer than the width of the work plane 40, such as to project from both sides thereof (see FIG. 3).

The mobile rods 50 and 51 are associated to means for moving which move the rods 50 and 51 cyclically and in succession along a same closed trajectory T, keeping them constantly parallel.

As illustrated in FIG. 1, the trajectory T develops entirely above the third conveyor belt 4, in a vertical and parallel plane to the advancing direction A of the work plane 40.

In particular, the trajectory T is overall trapezoid, exhibiting a lower tract T' which is parallel to the advancing direction A of the work plane 40, and is located at a height there-from which is less than a height of a pack 100.

As illustrated in FIG. 3, the means for moving comprise, for each mobile rod 50 and 51, two opposite chains which are located on opposite sides of the third conveyor belt 4 and lie in a respective vertical plane which is perpendicular to the advancing direction of the work plane 40.

More precisely, the rod 50 is longer and is fixed to a pair of external chains 52, while the rod 51 is shorter and is fixed to a pair of internal chains 53.

The external 52 and internal 53 chains on a same side of the third conveyor belt 4 are supported by a same vertical plate 60.

The vertical plate 60 is inferiorly fixed to the support frame 6 of the machine 1 by a respective bracket 61, and develops upwards to surmount the work plane 40.

Both the vertical plates 60 are orientated parallel to the advancing direction A of the work plane 40 and face each other.

In more detail, each vertical plate 60 supports, on the side thereof closed to the work plane 40, four rotatable cogwheels 54 about which an external chain 52 is wound.

The cogwheels 54 rotate about the rotation axes X1-X4, parallel to the work plane 40 and perpendicular to the advancing direction A thereof.

Further, the cogwheels 54 are positioned in such a way as to confer a shape on the respective external chain 52 which is the same as the trajectory T (see FIG. 1).

As illustrated in FIG. 3, each cogwheel 54 which is associated to a vertical plate 60 is identical and coaxial to a corresponding cogwheel 54 which is associated to the opposite vertical plate 60, so that the shapes of the two external chains 52 are reciprocally specular.

The mobile rod 50 is fixed to the external chains 52 by means of two identical connection brackets 50' which are located at ends of the mobile rod 50.

The connection brackets 50' project with respect to the chain 52 such as to position the rod 50 on the trajectory T which is most external (see also FIG. 1).

Each vertical plate 60 also supports four rotatable cogwheels 55 on which an internal chain 53 is wound.

Each cogwheel 55 is identical and coaxial to a respective cogwheel 54, so that the internal chains 53 are also shaped specularly and the same as the trajectory T.

The mobile rod 51 is fixed to the internal chains 53 by means of two connection brackets 51', identical to the brackets 50' associated to the rod 50.

The external chains 52 and the internal chains 53 are activated independently.

As illustrated in FIG. 5, the external chains 52 are activated by a rotating shaft 56 to which the cogwheels 54 are fixedly keyed, which cogwheels are coaxial along the rotation axis X1.

The rotating shaft 56 is rotatably supported by the opposite support plates 60, and is rotated by a respective brushless motor 57.

In this way, the external chains 52 move in perfect synchrony and at a same speed, so that the rod 50 can move along the trajectory T, keeping itself perfectly parallel.

Each of the cogwheels 55 located on the same rotation axis XI is rotatably coupled idle on the keying hub of the cogwheel 54 adjacent thereto, by interpositioning of a bearing.

Similarly, the internal chains 53 are rotated by a rotating shaft 58 to which the cogwheels 55 are fixedly keyed, the cogwheels being coaxial along the rotation axis X3 (see FIG. 4).

The rotating shaft 58 is rotatably supported by the opposite support plates 60, and is rotated by a respective brushless motor 59.

In this way, the internal chains 53 also move in perfect synchrony and at the same speed.

Each of the cogwheels 54 located on the same rotation axis X3 is rotatably coupled idle on the keying hub of the cogwheel 55 adjacent thereto, with the interpositioning of a bearing.

As illustrated in FIG. 6, the cogwheels 54 and 55 located along the remaining rotations axes X2 and X4 are keyed idle on a fixed shaft 62 which projects from the relative vertical plate 60, with the interpositioning of bearings.

The grouping device 5 is completed by a control system of the operation thereof.

The control system comprises sensors which measure the movement of the internal and external chains 52.

In the illustrated example, the sensors comprise two encoders 45 and 46, which are singly connected with a respective brushless motor 57 and 59 in order to count the revolutions of the relative rotating shaft 58 and 58 (see FIG. 2).

Figure 7:
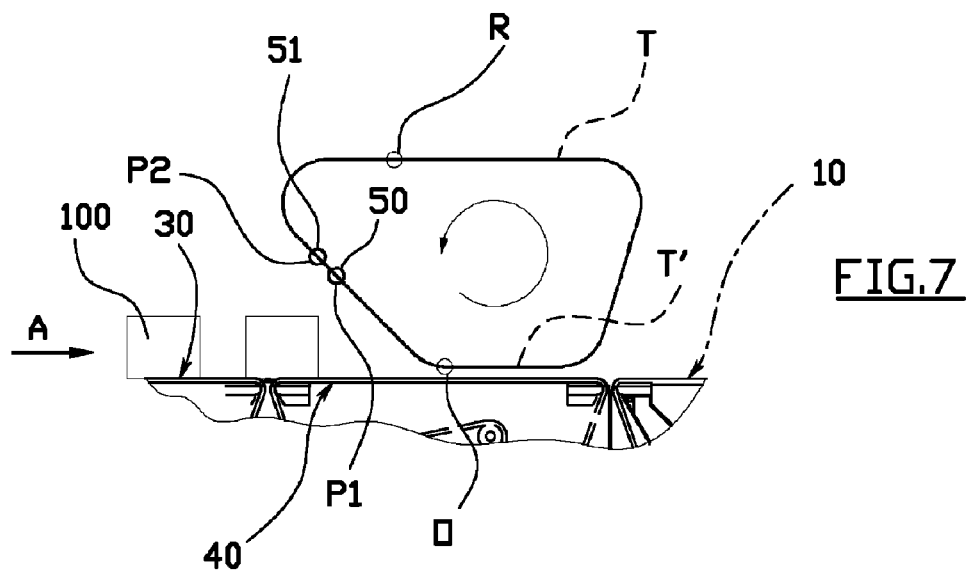
FIGS. 7 to 11 schematically illustrate a detail of FIG. 1 during five stages of operation of the machine.

The control system further comprises two further sensors, not illustrated, which detect passage of a respective mobile rod 50 and 51, at a predetermined point R of the trajectory T (see FIG. 7).

The operation of the above-described machine 1 is illustrated herein below, with particular reference to FIG. 2 and FIGS. 7 to 11.

During start-up, the control system of the grouping device 5 runs a zeroing cycle on the mobile rods 50 and 51 to detect the exact position thereof.

During this cycle, the rods are moved along the trajectory T in order to pass in succession through the fixed point R.

This passage is detected for each mobile rod 50 and 51 by the respective position sensor.

In this way, the control system learns the position of the rods 50 and 51, and thanks to the brushless motors 57 and 59 which drive the chains and thanks also to the relative encoders 45 and 46, the control system can move the chains along the trajectory T and stop them from time to time at precise points in the trajectory T.

The rods 50 and 51 are moved in an anti-clockwise direction, as in FIGS. 7 to 11.

The mobile rods 50 and 51 are initially halted in two distinct waiting positions, respectively indicated by P1 and P2.

At this point, a respective row of packs 100 is accumulated on each supply plane 20 of the first conveyor belts 2, the packs 20 being aligned in an advancing direction A (see FIG. 2).

The packs 100 of each row are generally in reciprocal contact and are staggered with respect to the packs 100 of the other row in a transversal direction, i.e. in a perpendicular direction to the advancing direction A of the supply plane 20.

The supply planes 20 run at the same speed, being activated by relative asynchronous motors 22, and sequentially advance the packs 100 of the respective rows towards the relative distancing planes 30.

The spacer planes 30 move at a higher speed than the supply planes 20.

In this way, when a pack 100 passes from a supply plane 20 to a successive distancing plane 30, it is subject to an acceleration which enables it to be distanced from consecutive packs 100 on the same row.

When the first pack 100 of one of the two rows passes before the relative photocell 34, the distancing plane 30 it is advancing on slows down and stops.

From the moment the slowing down begins, the encoder 33 connected to the motor 32 of the distancing plane 30 counts the revolutions of the motorised roller 31, in order precisely to acquire the position of the first pack 100 at the moment it stops.

When the first pack 100 of the other row arrives at the photocell 34 position, the pack 100 which was previously halted accelerates until it reaches the other first pack 100 and aligns there-with in a transversal direction.

Naturally if the first packs 100 of the two rows reach the photocells 34 in short times, there is only need for a correction of the relative speeds so as to align the packs 100 without having to halt them.

Note that if the packs 100 of the two rows are arranged on the relative supply plane 20 in reciprocal contact, or regularly equidistanced, the above-described stage of transversal alignment is performed only for the first packs 100. If this is not the case, the transversal alignment stage is repeated each time the photocells 34 detect the passage of two staggered packs 100.

In any case, the system is predisposed so that at the successive photocell 35 each pack 100 of a row is aligned transversally to a respective pack 100 of the other row.

In this way, the photocell 35 can perform an exact count of the pairs of aligned packs 100 which are treated by the machine 1.

At the exit of the distancing belts 30, the aligned pairs of packs 100 pass in sequence on the work plane 40.

In particular, thanks to the action of the distancing planes 30, each pair of packs 100 passing above the work plane 40 is certainly distanced from the following pair.

When the first pair of aligned packs 100 reaches the photocell 44, the encoder 43 which is associated to the motor 42 of the conveyor belt 4 begins to count the revolutions of the motorised roller 41, in order precisely to acquire the position of the first pair of packs 100 as it advances.

Figure 8:
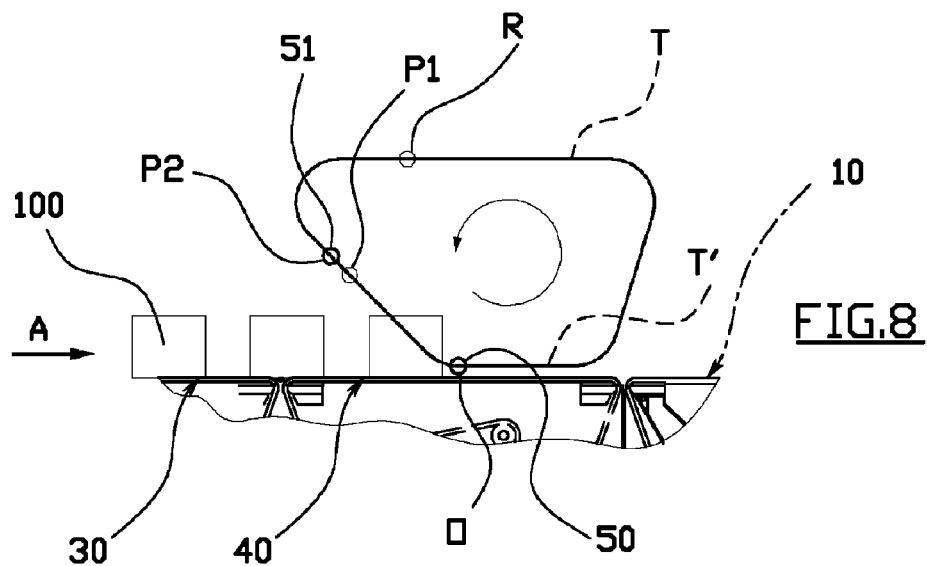

When the first pair of packs 100 reaches a predetermined position on the work plane 40, the mobile rod 50 in the waiting position P1 is displaced into the operative position O, positioned at the start of the active tract T' of the trajectory T thereof, in which it is placed right in front of the packs 100 with respect to the advancing direction A (see FIG. 8).

Then the mobile rod 50 moves along the active tract T' of the trajectory T, performing a displacement in the advancing direction of the work plane 40 at a slower speed than the work plane 40.

Figure 9:
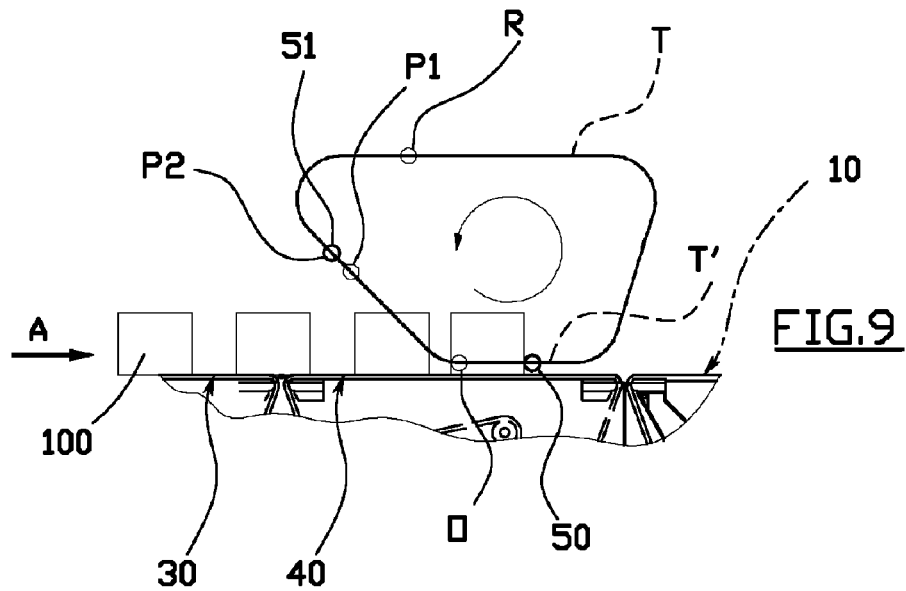

In this way, the first pair of packs 100 progressively reaches the rod 50 and, once it has made contact therewith, is braked by the rod 50 with respect to the underlying work plane 40 which continues to run at the same speed, and drags thereon (see FIG. 9).

Figure 10:
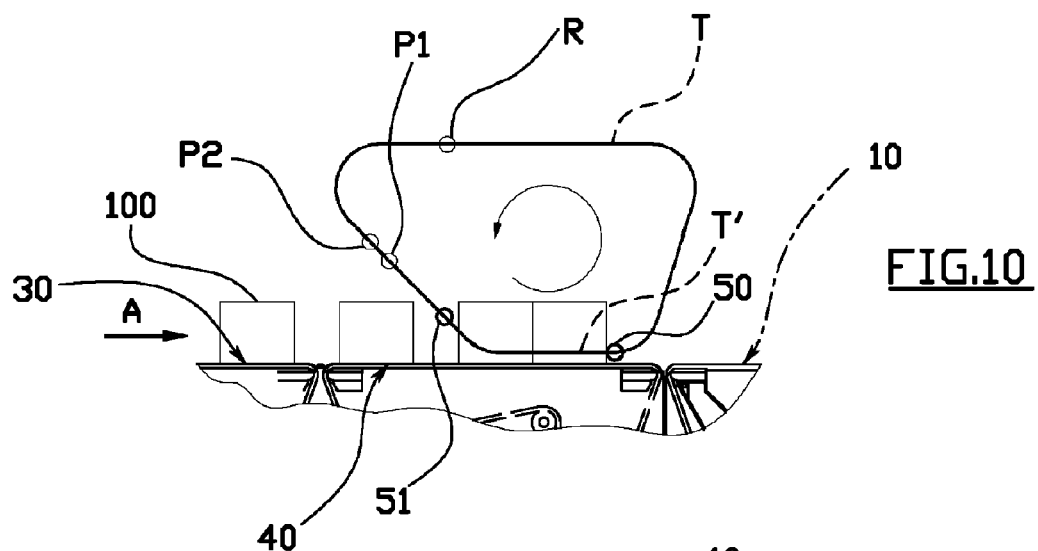

In the meantime, the following pair of packs 100 advancing on the work plane 40 progressively nears the first pair, reaching contact there-with (see FIG. 10).

Naturally the position of the following group of packs 100 is also detected by the photocell 44.

Figure 12:
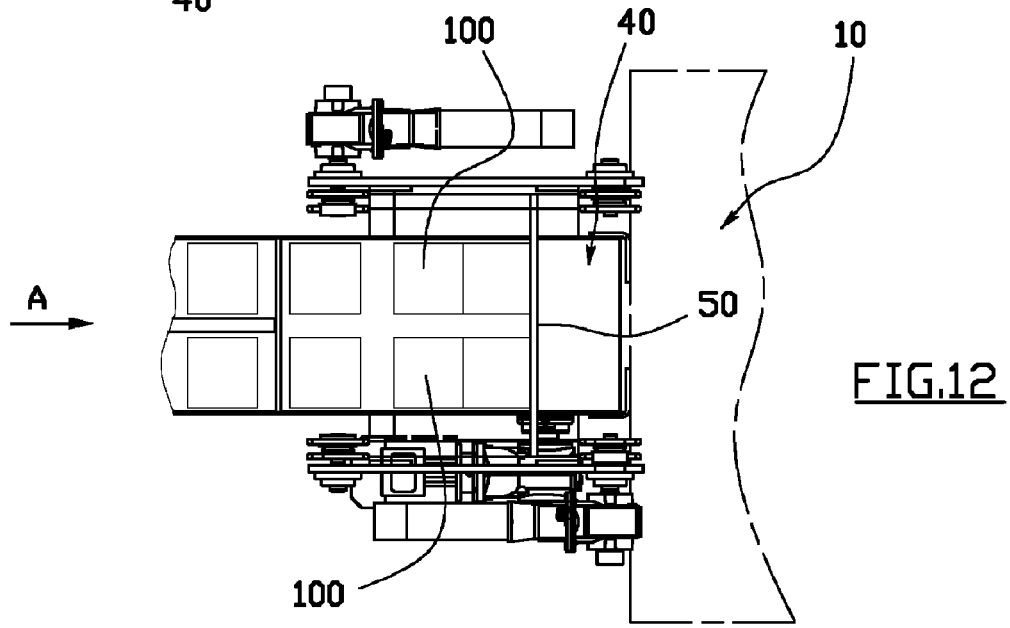
FIG. 12 is a plan view of FIG. 10.

In this way, a group of four packs 100 is achieved, arranged reciprocally adjacent and aligned both in the advancing direction A and in the transversal direction; the group can be treated by successive means for manipulating as if it were one single and larger pack (see FIG. 12).

When the braking stage has finished, the first mobile rod 50 moves rapidly towards the initial waiting position P1 in order to allow the group of packs 100 to exit from the grouping device 5, and to enable the group to pass onto the service plane 10.

Figure 11:
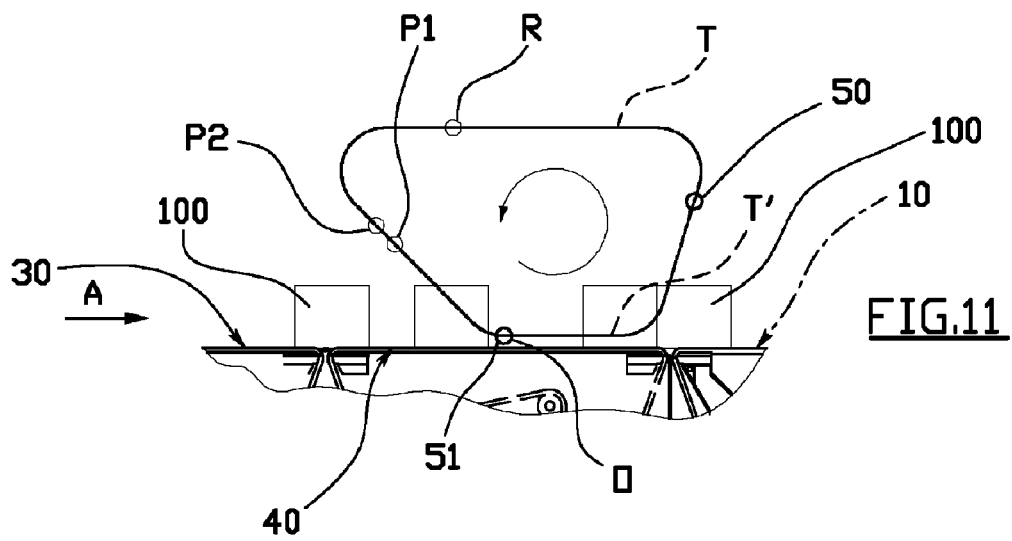

In the meantime, the other mobile rod 51 is brought into the operative position O in order to perform the same stages as the mobile rod 50, and to brake a following pair of packs 100 (see FIG. 11).

Preferably the action of the mobile rod 51 begins while the mobile rod 50 is still following the active tract T' of the trajectory T; this is in order to reach a high process speed.

The functioning of the machine 1 is repeated cyclically and always in the same way.

Obviously an expert in the field might make numerous modification of a practical-applicational nature to the machine 1 as described herein, without however forsaking the sought ambit of protection for the invention as claimed.

For example, each mobile rod 50 and 51 might brake the respective packs 100 for a time sufficient to enable the grouping of more than two pairs of packs 100.

Further, the machine 1 might be provided with only one supply plane 20 and one distancing plane 30 in order to be able to treat only one row of packs 100.

The invention claimed is:

1. A machine for grouping packs comprising:
a sliding work plane for advancing in sequence at least a consecutive and equidistanced row of packs along a predetermined advancing direction (A); and
retaining means for cyclically braking the advancing of one of the packs of the row with respect to the sliding work plane, the retaining means comprising at least a striker body and a moving means for cyclically locating the striker body close to a pack advancing on the work plane, such that the striker body receives the pack in contact there-with, preventing the pack from advancing at a same speed as a previous speed thereof on the work plane,
wherein said moving means comprises two chains at the opposite ends of which at least one striker body per chain is fixed, the chains developing in reciprocally specular shapes which shapes are equal to a trajectory (T) to be imparted on the striker bodies themselves, the machine having motor means for activating the chains independently along substantially the same trajectory (T).

2. The machine of claim 1, wherein the moving means locates the striker body in an operative position (O) in which the striker body is located close to a pack to be braked, and the moving means causes the striker body to displace from the operative position (O) in the advancing direction (A) of the work plane at a speed which is slower than an advancing speed of the work plane.

3. The machine of claim 2, wherein the displacement of the striker body occurs in a parallel direction to the advancing direction (A) of the work plane.

4. The machine of claim 2, wherein the moving means moves the striker body along a predetermined closed trajectory (T) which comprises an active tract (T) which corresponds to the displacement of the striker body in the advancing direction of the work plane.

5. The machine of claim 4, wherein the closed active tract (T') develops in a plane which is perpendicular to the work plane and is parallel to the advancing direction (A) thereof.

6. The machine of claim 5, wherein the striker body is a rod arranged parallel to the work plane and transversally with respect to the advancing direction (A) thereof.

7. The machine of claim 6, wherein the moving means comprises:
two chains fixed to opposite ends of the rod, which chains develop in reciprocally specular shapes which shapes are equal to the trajectory (T) to be imparted on the rod itself, and
motor means for activating the chains in synchrony.

8. The machine of claim 2, wherein the retaining means comprises a plurality of the mobile striker bodies which assume the operative position (O) at successive times, in order to brake respective packs in succession on the work plane.

9. The machine of claim 8, wherein the operative position (O) of each striker body is the same.

10. The machine of claim 9, wherein the displacement that the striker bodies make in the advancing direction (A) of the work plane is the same.

11. The machine of claim 2, comprising a control system for commanding movement of the striker body.

12. The machine of claim 11, wherein the control system comprises at least a sensor for detecting passage of the packs advancing on the work plane at a fixed point along the work plane.

13. The machine of claim 12, wherein the sensor is a photocell.

14. The machine of claim 11, wherein the control system comprises at least a sensor for measuring the advancing of the work plane.

15. The machine of claim 14, wherein the work plane is embodied by a conveyor belt activated by at least a motorized roller, and the sensor is an encoder which counts revolutions of the motorized roller.

16. The machine of claim 1, wherein the work plane contemporaneously advances a plurality of rows of packs and the retaining means contemporaneously brakes advancing of a pack of each of the rows.

17. The machine of claim 1, further comprising a transferring means for supplying the packs onto the work plane.

18. The machine of claim 17, wherein the transferring means comprises at least:
a sliding supply plane for advancing a row of packs such as to supply the packs one by one onto
a sliding distancing plane which advances at a greater speed than the supply plane and which transfers the packs in succession onto the work plane.

19. The machine of claim 18, wherein the transferring means comprises:
a plurality of sliding supply planes singly advancing a respective row of packs; and
a corresponding plurality of sliding distancing planes, each of which receives a pack at a time from a respective supply plane and transfers the pack onto the work plane, the distancing planes sliding at different speeds from one another, in sliding directions which are parallel to the advancing direction (A) of the work plane.

20. The machine of claim 19, comprising a control system for varying relative speeds of the distancing planes, such as to align the packs advancing on the distancing planes in a transversal direction with respect to the advancing direction (A) thereof.

21. The machine of claim 20, wherein the control system comprises a plurality of sensors, each of which detects passage of the packs advancing on a respective distancing plane at a fixed point.

22. The machine of claim 21, wherein the sensors are photocells.

23. The machine of claim 20, wherein the control system comprises a plurality of sensors, each of which measures the advancing of a respective distancing plane.

24. The machine of claim 23, wherein each of the distancing planes is made available by a conveyor belt activated by at least a relative motorized roller, and each of the sensors is an encoder for counting a number of revolutions of the motorized roller.

* * * * *